United States Patent Office 3,639,525
Patented Feb. 1, 1972

3,639,525
RAW MIXTURE OF RUBBERY ISOBUTYLENE POLYMER WITH CRYSTALLINE TRANS-1,4-CONJUGATED DIOLEFIN POLYMER
Eric G. Kent, Sarnia, Ontario, Canada, assignor to Polymer Corporation Limited
No Drawing. Filed Nov. 27, 1967, Ser. No. 685,954
Claims priority, application Canada, Dec. 14, 1966, 977,956
Int. Cl. C08d 9/08
U.S. Cl. 260—888
4 Claims

ABSTRACT OF THE DISCLOSURE

A protective covering composition, suitable for use as an electrical tape, which comprises (A) a solid raw polymer mixture of 60–90 parts by weight of a rubbery polymer of isobutylene and (B) 40–10 parts by weight of a high molecular weight polymer of a $C_4$–$C_8$ conjugated diolefin, said diolefin polymer having at least 85% of the diolefin units in the trans-1,4 configuration, said parts being parts per 100 parts total polymer.

---

This invention relates to uncured polymer compositions based on mixtures of rubbery polymer of isoolefin with diolefin polymer having a high trans-1,4 content.

Raw rubbers either alone or in blends find little utility in the uncured state for they are lacking in properties such as strength and dimensional stability. The so-called thermoplastic rubbers are one exception but they are comparatively difficult to manufacture. There is a need in the art for compositions which do not involve a curing process yet which possess adequate physical and chemical properties for use in many applications. Such applications include sheet materials and tapes for a variety of uses.

The tapes of the prior art consist of a backing film and an adhesive film deposited thereon. The backing film provides strength, protection, insulation and/or decoration and is made of fabrics, film-forming plastics, vulcanized rubbers and generally materials that are flexible and strong. The adhesive film is required to provide bondability to the tape. A satisfactory tape of uniform composition that is both strong and self-bonding at normal conditions of application has not been developed. It is especially true of electrical tapes that must insulate, be weather resistant and bondable at room or climatic temperatures to itself and to other insulating materials used in cable and wire industry such as butyl rubber or polyethylene.

It is an object of this invention to provide a protective covering composition of a raw polymer mixture. Another object is to provide a pressure sensitive adhesive tape made of the above polymer mixture and suitable for use as an electrical insulating tape. It is a further object of the invention to provide a method of covering an article with said tape.

These and other objects are achieved in a novel protective covering composition which comprises a solid raw polymer mixture of a major proportion by weight of a rubbery polymer of an isoolefin and a minor proportion by weight of a polymer of a conjugated diolefin having at least 85% of the diolefin units in the trans-1,4 configuration.

In a specific embodiment of this invention, a pressure sensitive adhesive tape of uniform structure is provided which comprises a raw polymer mixture of 60–90 parts by weight of a rubbery polymer of isobutylene having a Mooney viscosity (ML–4′ at 100° C.) from 35 to 85 and conversely 40–10 parts by weight of a high molecular weight crystalline polymer of a conjugated diolefin having at least 85% of the diolefin units in the trans-1,4 configuration, said parts being parts per 100 parts total polymer. Furthermore, a method is provided for covering an article of commerce with the tape as described above which comprises stressing said tape to about 100% strain and while under stress applying it to said article or a part thereof in such manner as to produce an overlap whereby the overlapped parts bond to form a cover.

The present invention is based on the observation that a sheet made of a mixture of raw butyl rubber and raw trans-1,4 polyisoprene unexpectedly bonded to itself when first stretched and then contacted under slight pressure. The bond strength increased as the contact time was increased so that one week afterwards the sheets seemed to be essentially fused.

The composition prepared according to the present invention contains two essential components: (a) a minor proportion of a polymer of a conjugated diolefin, and (b) a major proportion of an isoolefin polymer. The component present in a minor proportion is a high molecular weight polymer of a conjugated diolefin having at least 85% of monomer units in the trans-1,4 configuration. It is preferably a crystalline polymer characterized by a melting point of about 50 to 120° C. The conjugated diolefin as referred to herein may be an acyclic hydrocarbon or halogenated hydrocarbon having 4 to 8 carbon atoms, for example butadiene-1,3, piperylene, isoprene and 2-chlorobutadiene-1,3. The molecular weight may range from about 50,000 to about 600,000 as calculated from intrinsic viscosity values determined in the usual manner. The raw polymer Mooney viscosity (ML–4′ at 100° C.) may generally range from 10 to 80. The term "polymer" is understood to include both homopolymers and copolymers with a minor amount of a copolymerizable monomer such as butadiene, piperylene, styrene, ethylene and propylene, and where present such copolymerizable monomer is present in an amount of less than 20 mole percent and preferably less than 5 mole percent of the sum of the copolymerized monomer units. Of the homopolymers, trans-1,4 polyisoprene, trans-1,4 polychloroprene and trans-1,4 polybutadiene are representative examples. The preferred polymer is a trans-1,4 polyisoprene and contains at least 85%, preferably at least 90%, of the isoprene units in the trans-1,4 configuration. Associated with the high content of trans-1,4 hydrocarbon monomer units is a high degree of crystallinity of the trans-1,4 polymer. Such crystallinity as determined by X-ray diffraction method may vary within wide limits from 5 to 50%, although it is preferred to use polymers having a crystallinity between 15 and 30%. The trans-1,4 polymers of conjugated diolefins as used in this invention are conventional polymers and may be produced by known processes.

The polymer of an isoolefin as the major component in the composition is a high molecular weight homopolymer of an isoolefin or copolymer of an isoolefin with 0.5 to 15 mole percent conjugated diolefin hydrocarbon. The isoolefin may be a $C_4$ to $C_7$ isoolefin, although isobutylene is preferred. Minor proportions of other copolymerizable monomer(s) such as styrene or 2-methyl 1,5-hexadiene may also be included if desired. The production of isoolefin polymers is well known in the art, as by example with a Friedel-Crafts catalyst in a nonreactive diluent at a temperature between 0° C. and −164° C. In general the viscosity average molecular weight may be within the range 100,000 to 600,000, especially within the range 250,000 to 350,000. A suitable raw polymer Mooney viscosity (ML–4′ at 100° C.) for the isoolefin polymer has been found to be from 35 to 85. Such homo- or copolymers are amorphous and have the properties of easy flow and tackiness but by themselves lack the necessary balance of properties needed in a covering composition such as a tape. For example, milling a sheet from the isoolefin polymer gives a specimen which has a rough surface and lacks dimensional stability; whereas a mixture of the same polymer with a minor amount of the polymer of conjugated diolefin defined above produces a smooth attractive sheet closely resembling that of a cured rubber specimen.

The proportions of the polymers to be blended may vary considerably depending on the desired strength, dimensional stability and appearance. As the 1/1 ratio is approached the composition becomes stiff and leathery and less capable of self-bonding. On the other hand, as little as five parts of the trans-1,4 polymer may be used, although the preferred ratio is 10 to 40 parts per 90 to 60 parts by weight of isolefin polymer, based on 100 parts by weight total polymer.

The composition of this invention is formed by blending the two polymers, for example on an open two-roll mill or in an internal mixer (Banbury). The crystalline polymer is preferably added to the mill first, and when banded followed by the isoolefin polymer, the blending continued for several minutes to give a visibly uniform mass. The temperature of the blending device required to band the crystalline polymer will vary with the specific crystalline polymer chosen but may readily be determined by trial. For trans-1,4 polyisoprene, a temperature in the range of 55° C. to 150° C. has been found suitable. The blend may also contain a minor amount of filler, coloring agent, antidegradant or even additional tackifier if desired, and the composition calendered or otherwise shaped to the desired form.

The composition has a relatively high tensile strength and elongation which is rather surprising for a raw, that is, uncured rubber-like composition. It is also abrasion-, tear- and scuff resistant and as such is suitable as a replacement for leather in protective or decorative covers for articles such as baseballs or luggage. Sheets, 5 mm. thick or less, are flexible at room temperature and moderately hard, having a Shore A hardness in the order of 20 to 70. It has a good dielectric strength and high volume resistivity and can be used as insulating material for electrical conductors, even under the conditions of high humidity or under water. The composition which essentially is non-bonding and non-blocking, i.e. non-adhering when stacked, is then sheeted and when desired cut to form a tape. The tape is stretched, preferably to at least 200% of the original dimension, that is, 100% elongation using the term accepted in rubber industry, to form a pressure sensitive adhesive tape. This tape is capable of self-bonding and also of bonding to materials such as butyl rubber, polyethylene, phenol-formaldehyde resins. Such tapes are particularly useful in the electrical trade. The tapes may be used with advantage for example for splicing two cable lengths, or repairing damaged insulation. The strength of the bond depends on the degree of stretching, contact time and the pressure acting on the plies in contact. Ultimately the bond may be as strong as the composition itself. The tapes made from this composition may also be used as pipe-thread tapes for sealing threaded pipe connections and as masking, protective or decorative tapes.

The composition is usually sheeted and cut and rolled at a temperature of less than 50° C. without stretching. When applying to an article or a part thereof to form a protective, insulating or decorative cover thereon, the tape is stretched generally to at least 100% elongation and wound in such a manner as to produce substantial overlap. The end of the tape preferably overlapping completely the underlying ply is slightly pressed onto that ply so as to establish a firmer bond. The cover made in this manner may be unwound and rewound in a different manner or on a different article, if desired, provided it is done before complete fusion of the tape plies occurs.

Illustration of the invention by the following examples is given for further understanding thereof.

EXAMPLE I

Two raw polymers were physically blended: (A) a copolymer of isobutylene and isoprene, commonly known as butyl rubber, having a mole percent unsaturation of 1.6 and a Mooney viscosity (ML-4' at 100° C.) of 75; (B) a synthetic polyisoprene having a trans-1,4-configuration of 95%, a crystallinity of 29%, and a Mooney viscosity (ML-4' at 100° C.) of 30.

By using an open two-roll mill, the blend was prepared by first banding 25 parts of the crystalline trans-1,4 polyisoprene at a temperature of 97° C. and then adding 75 parts of the isobutylene copolymer. After five minutes milling, a visibly uniform blend of the two polymers was sheeted off the mill. Sheets measuring 15 x 15 x 0.2 centimeter were moulded from the mixture thus prepared, and in appearance they resembled sheets of cured rubber, i.e. they were smooth and had a degree of dimensional stability not usually associated with raw polymer. By contrast a moulded sheet of unblended isobutylene copolymer displayed surface roughness and lack of retention of shape. The moulded sheets of the blend had a Shore C hardness of 25, a tensile strength of 27.5 kilograms per square centimeter and an elongation of 290%.

Self-bonding properties of the composition were determined on a 0.6 centimeter strip cut from a moulded sheet 6 cm. x 6 cm. x 0.06 cm. The strip was folded with a Holland cloth interliner inserted to a depth of 1.25 cm. from the ends of the fold and then weighted for one minute with a weight of 500 grams. Next the free ends of the folded strips were placed in the jaws of an Instron stress-strain tester and pulled apart at a jaw separation speed of 5 centimeters per minute. The bond strength, expressed in grams, was the force required to pull apart the folded strips. Similar procedure was also used on a strip that had been stretched to a point approaching the yield point, at about 250% elongation, prior to folding and weighting.

The unstretched strip showed a bond strength of 70 grams and the stretched one 390 grams.

EXAMPLE II

A blue coloring pigment was milled into the blend of Example I in a proportion of 5 parts by weight per 100 parts of the blend. A 0.6 cm. strip was cut from a moulded sheet, 0.06 cm. thick, and wound on a wooden rod without pre-stretching, in a partially overlapping fashion. After a period of 15 minutes, the strip could be unwound with ease. A second strip cut from the same sheets was pre-stretched to the order of 300% elongation as it was wound on the rod. After a period of 15 minutes the strip could not be removed without tearing. Similar observations were made on compositions containing 5 parts by weight per 100 parts of the blend of a black and yellow coloring pigment, respectively.

An additional experiment was carried out with the strips containing yellow pigment. The two strips used in the experiment were dusted with powdered talc on both sides. When wound on the rod the non-stretched strip did not bond at all. The pre-stretched strip, on the other hand, readily adhered to the underlying plies wound on the rod.

A still further experiment was performed on the above tape compositions containing black and yellow pigments respectively by placing these tapes in a cold box at 0° C. overnight, removing the cold tapes from the cold box, and stretching and winding onto a mandrel. Examination readily confirmed that good bonding was established even with the cold tapes.

EXAMPLE III

The ability of the composition of this invention to bond and remain bonded to itself at elevated temperatures was examined in this experiment. Strips of the 75/25 blend of Example I as well as blends of the same component materials but in the ratio 85/15 and 95/5 were found to remain firmly bonded even after heating at 100° C. for 15 minutes provided the strips were pre-stretched before applying to a mandrel as an overlapped tape. In contrast, it was found that the same compositions without the act of pre-stretching did not bond either before or after the heating period.

EXAMPLE IV

Another blend was prepared and tested as for Example I except that instead of copolymer (A) an isobutylene-isoprene copolymer was used which had a mole percent unsaturation of 0.7 and a Mooney viscosity (ML-4' at 100° C.) of 45. Stress-strain measurements of a moulded sheet showed a tensile strength of 19.6 kilograms per centimeter and an elongation of 480%. The bond strength was 120 grams for the unstretched specimen and 210 grams for the pre-stretched specimen.

By comparison, a blend employing a butadiene/acrylonitrile rubbery copolymer in place of the isobutylene polymer was prepared with the trans-1,4 polyisoprene and treated as for Example I. The butadiene copolymer had an acrylonitrile content of 34 weight percent and a Mooney viscosity (ML-4' at 100° C.) of 47. The bond strength of the unstretched specimen was 0 gram and the tack strength of the pre-stretched specimen was only 20 grams.

EXAMPLE V

The trans-1,4 polyisoprene polymer of Example I was replaced by a trans-1,4 chloroprene polymer having a Mooney viscosity (ML-4' at 100° C.) of 20 and a crystallinity of about 25%. When moulded and tested as for Example I, the blended composition had a tensile strength of 13.3 kilograms per centimeter squared and an elongation of 1040. The bond strength was 5 grams for the unstretched specimen and 140 grams for the pre-stretched specimen.

EXAMPLE VI

The trans-1,4 polyisoprene of Example I was replaced by a trans-1,4 polybutadiene-1,3 having a Mooney viscosity (ML-4' at 100° C.) of 20, a crystallinity of 20% and a trans-1,4 configuration of greater than 95%. Moulding and testing of the blended composition, as in the manner described in Example I, revealed a bond strength of 70 grams in the unstretched specimen and 390 grams in the pre-stretched specimen.

What is claimed is:
1. A protective tape capable of adhesive bonding upon stretching to at least 100% elongation which comprises a solid raw polymer mixture of 60–90 parts by weight of a rubbery polymer of isobutylene and 40–10 parts by weight of a crystalline high molecular weight polymer of a conjugated diolefin having 4–8 carbon atoms, said diolefin polymer having at least 85% of the diolefin units in the trans-1,4 configuration and having a Mooney viscosity (ML-4' at 100° C.) from 10 to 80, said raw polymer mixture being free of vulcanizing agents and having a Shore A hardness of about 20 to 70, said parts being parts per 100 parts total polymer.
2. The protective tape according to claim 1 in which the isobutylene polymer is a polyisobutylene or a copolymer of 99.5–85 mole percent of isobutylene and 0.5–15 mole percent of a conjugated diolefin hydrocarbon.
3. The tape according to claim 2 in which the isobutylene polymer has a Mooney viscosity (ML-4' at 100° C.) from 35 to 85.
4. The tape according to claim 1 in which the polymer of conjugated diolefin is a trans-1,4 polyisoprene having more than 90% of the isoprene units in the trans-1,4 configuration.

References Cited

UNITED STATES PATENTS

| 3,223,694 | 12/1965 | Farrar | 260—94.2 |
| 3,250,733 | 5/1966 | Giller | 260—888 |
| 3,459,089 | 8/1969 | Clark | 260—888 |

OTHER REFERENCES

Vanderbilt Rubber Handbook, Vanderbilt Co. Inc., New York, N.Y., 1958, pp. 91 and 101.

SAMUEL H. BLECH, Primary Examiner

U.S. Cl. X.R.

117—232; 156—53; 260—41.5 R, 889